United States Patent
Walker et al.

(10) Patent No.: US 11,440,511 B2
(45) Date of Patent: Sep. 13, 2022

(54) INTEGRATED VEHICLE JACKING ASSEMBLY

(71) Applicants: Samuel Walker, Cameron, TX (US);
Douglas Buck, Burlington, TX (US)

(72) Inventors: Samuel Walker, Cameron, TX (US);
Douglas Buck, Burlington, TX (US)

( * ) Notice: Subject to any disclaimer, the term of this patent is extended or adjusted under 35 U.S.C. 154(b) by 383 days.

(21) Appl. No.: 16/660,899

(22) Filed: Oct. 23, 2019

(65) Prior Publication Data
US 2021/0122337 A1  Apr. 29, 2021

(51) Int. Cl.
| | | |
|---|---|---|
| *B60S 9/02* | (2006.01) |
| *B60S 9/04* | (2006.01) |
| *B60T 3/00* | (2006.01) |
| *B66F 3/46* | (2006.01) |
| *B60S 9/10* | (2006.01) |
| *B60S 9/12* | (2006.01) |
| *B66F 3/24* | (2006.01) |
| *B66F 3/44* | (2006.01) |

(52) U.S. Cl.
CPC . *B60S 9/02* (2013.01); *B60S 9/04* (2013.01); *B60T 3/00* (2013.01); *B66F 3/46* (2013.01); *B60S 9/10* (2013.01); *B60S 9/12* (2013.01); *B66F 3/247* (2013.01); *B66F 3/44* (2013.01)

(58) Field of Classification Search
CPC ...... B60S 9/12; B60S 9/04; B60S 9/06; B60S 9/10; B60S 9/02; B60T 3/00; B66F 3/46; B66F 3/44; B66F 3/247; B66F 3/12
See application file for complete search history.

(56) References Cited

U.S. PATENT DOCUMENTS

| | | | | |
|---|---|---|---|---|
| 2,103,117 A | * | 12/1937 | Pearlman | B60S 9/04 254/418 |
| 2,131,296 A | * | 9/1938 | Petsche | B60S 9/04 254/102 |
| 2,613,764 A | * | 10/1952 | Worden | B60T 3/00 188/32 |
| 2,723,005 A | * | 11/1955 | Wink | B60T 3/00 188/32 |
| 2,850,290 A | * | 9/1958 | Borgmann | B60S 9/04 280/124.167 |
| 3,070,386 A | * | 12/1962 | Gregg | B62D 53/0864 280/476.1 |
| 3,297,111 A | * | 1/1967 | Lisboa | B60T 3/00 188/32 |

(Continued)

FOREIGN PATENT DOCUMENTS

WO WO02058972 8/2002

*Primary Examiner* — Jonathan Liu
*Assistant Examiner* — Taylor L Morris

(57) ABSTRACT

An integrated vehicle jacking assembly includes a plurality of jacks that is each coupled to a bottom side of a vehicle. Each of the jacks is actuatable into an extended position for lifting a respective driver's side or passenger's side of the vehicle upwardly thereby facilitating tires on the respective driver's side or passenger's side of the vehicle to be removed and replaced. A control unit is positioned within the vehicle and the control unit is operationally coupled to each of the jacks. The control unit actuates one or both of the jacks between the extended position and the retracted position. A plurality of wheel chocks is provided for inhibiting the vehicle from rolling when the vehicle is lifted.

11 Claims, 6 Drawing Sheets

(56) References Cited

U.S. PATENT DOCUMENTS

| | | | | |
|---|---|---|---|---|
| 4,031,983 A * | | 6/1977 | Lentini | B60T 3/00 188/32 |
| 4,165,861 A * | | 8/1979 | Hanser | B60S 9/12 254/423 |
| 4,911,270 A * | | 3/1990 | Hudson | B60T 3/00 188/32 |
| 4,993,688 A * | | 2/1991 | Mueller | B60S 9/12 254/423 |
| 5,219,429 A * | | 6/1993 | Shelton | B60S 9/12 254/423 |
| 5,224,688 A * | | 7/1993 | Torres | B60S 9/12 254/423 |
| 5,232,206 A * | | 8/1993 | Hunt | B60S 9/12 254/423 |
| D348,966 S | | 7/1994 | Guyton | |
| 5,465,940 A * | | 11/1995 | Guzman | B60S 9/12 254/423 |
| 5,586,621 A * | | 12/1996 | Moon | B60T 3/00 188/32 |
| 5,722,641 A * | | 3/1998 | Martin | B60S 9/12 254/423 |
| 5,765,810 A * | | 6/1998 | Mattera | B60S 9/12 254/423 |
| 5,931,500 A * | | 8/1999 | Dagnese | B60S 9/12 280/766.1 |
| 6,079,742 A * | | 6/2000 | Spence | B25B 21/002 254/423 |
| 6,224,040 B1 * | | 5/2001 | Mejias | B60S 9/06 254/423 |
| 6,237,953 B1 * | | 5/2001 | Farmer | B60S 9/06 254/423 |
| 6,404,073 B1 * | | 6/2002 | Chiang | B60R 25/001 254/423 |
| 6,527,254 B1 | | 3/2003 | Prevete | |
| 6,623,035 B1 * | | 9/2003 | Schneider | B60S 9/04 248/161 |
| 6,895,648 B1 * | | 5/2005 | Willett | B60S 9/12 254/423 |
| 6,913,248 B1 * | | 7/2005 | Schmitz | B60S 9/12 254/423 |
| 6,991,221 B1 | | 1/2006 | Rodriguez | |
| 7,000,740 B2 * | | 2/2006 | Chrisco | B60T 3/00 188/32 |
| 7,040,461 B2 * | | 5/2006 | Chrisco | B60T 3/00 188/32 |
| 7,044,445 B1 * | | 5/2006 | Crawford | B60S 9/08 254/425 |
| 7,063,307 B2 | | 6/2006 | Williams, Sr. | |
| 7,243,907 B2 | | 7/2007 | Singh | |
| 7,334,777 B2 * | | 2/2008 | Jackson | B60S 9/12 254/418 |
| 7,416,215 B1 * | | 8/2008 | Rosario | B60S 9/08 254/424 |
| 8,424,848 B1 | | 4/2013 | Hawkins, Jr. | |
| 8,844,906 B2 | | 9/2014 | Idan | |
| 8,919,739 B1 | | 12/2014 | Romero | |
| 9,889,824 B2 * | | 2/2018 | Jackson, Sr. | B66F 3/247 |
| 10,343,653 B1 * | | 7/2019 | Garceau | G05D 1/0016 |
| 10,960,856 B1 * | | 3/2021 | Weddle | B66F 3/44 |
| 2002/0100901 A1 * | | 8/2002 | Topelberg | B60S 9/12 254/423 |
| 2006/0060429 A1 * | | 3/2006 | Malinowski | B60T 3/00 188/32 |
| 2009/0138126 A1 * | | 5/2009 | Marsh | G05D 15/01 700/279 |
| 2014/0214283 A1 * | | 7/2014 | Maurer | H02P 29/00 701/49 |
| 2014/0231732 A1 * | | 8/2014 | Piuian | B60S 9/12 254/423 |
| 2015/0127216 A1 * | | 5/2015 | Jackson, Sr. | B60S 9/12 701/36 |
| 2016/0009256 A1 * | | 1/2016 | Dondurur | B60S 9/12 254/423 |
| 2016/0167626 A1 * | | 6/2016 | Alnemari | B60S 9/04 280/763.1 |
| 2016/0185322 A1 * | | 6/2016 | Vierkotten | B66C 23/90 701/50 |
| 2017/0057472 A1 * | | 3/2017 | Jackson, Sr. | B66F 3/46 |
| 2018/0178763 A1 * | | 6/2018 | Fong | B60S 9/12 |
| 2020/0355498 A1 * | | 11/2020 | Manfreda | G01B 5/24 |
| 2021/0291718 A1 * | | 9/2021 | Thompson | B60S 9/04 |

* cited by examiner

INTEGRATED VEHICLE JACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to jacking devices and more particularly pertains to a new jacking device for lifting and lowering a vehicle for removing and replacing tires.

(2) Description of Related Art Including Information Disclosed Under 37 CFR 1.97 and 1.98

The prior art relates to jacking devices.

BRIEF SUMMARY OF THE INVENTION

An embodiment of the disclosure meets the needs presented above by generally comprising a plurality of jacks that is each coupled to a bottom side of a vehicle. Each of the jacks is actuatable into an extended position for lifting a respective driver's side or passenger's side of the vehicle upwardly thereby facilitating tires on the respective driver's side or passenger's side of the vehicle to be removed and replaced. A control unit is positioned within the vehicle and the control unit is operationally coupled to each of the jacks. The control unit actuates one or both of the jacks between the extended position and the retracted position. A plurality of wheel chocks is provided for inhibiting the vehicle from rolling when the vehicle is lifted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
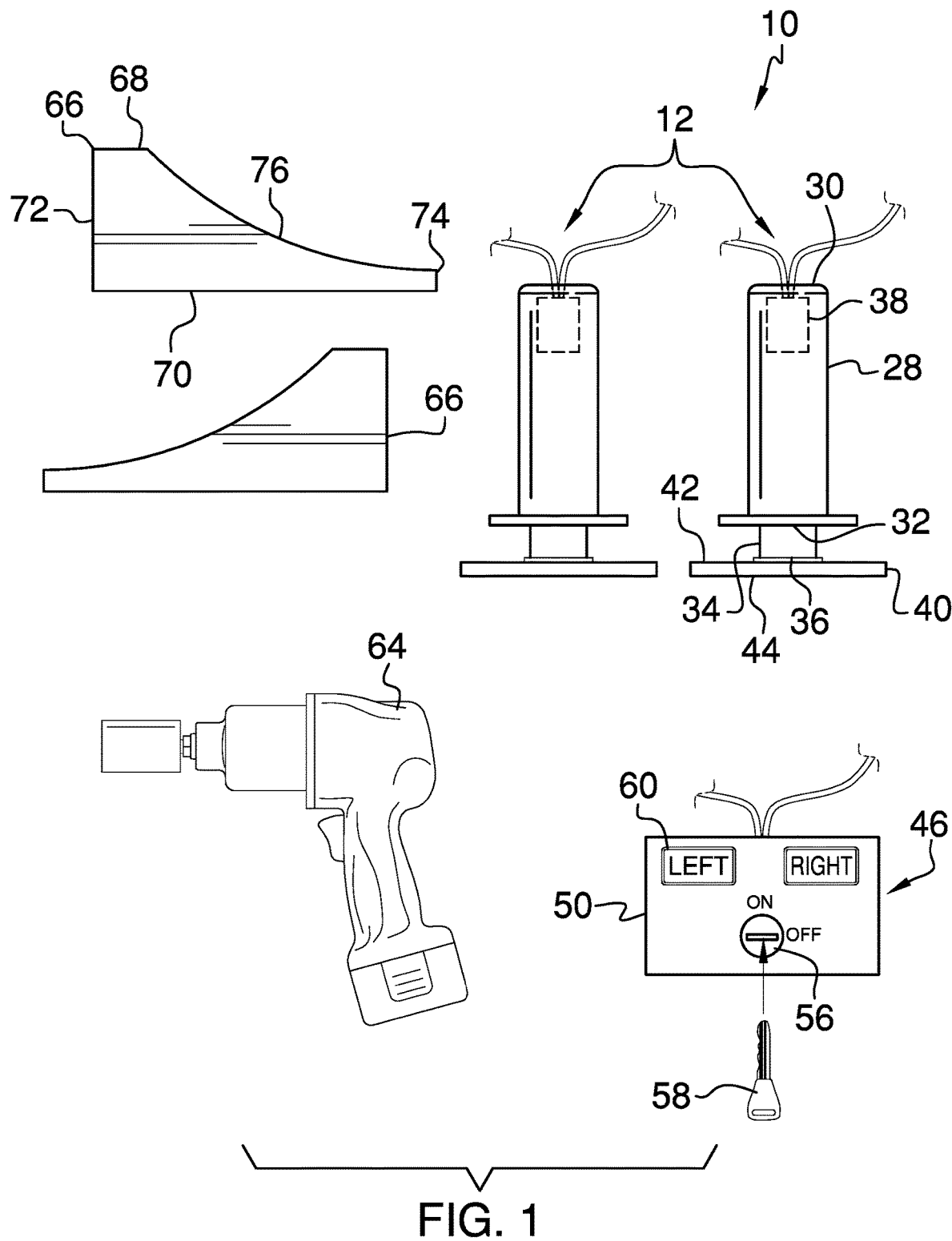
FIG. 1 is a perspective view of an integrated vehicle jacking assembly according to an embodiment of the disclosure.
Figure 2:
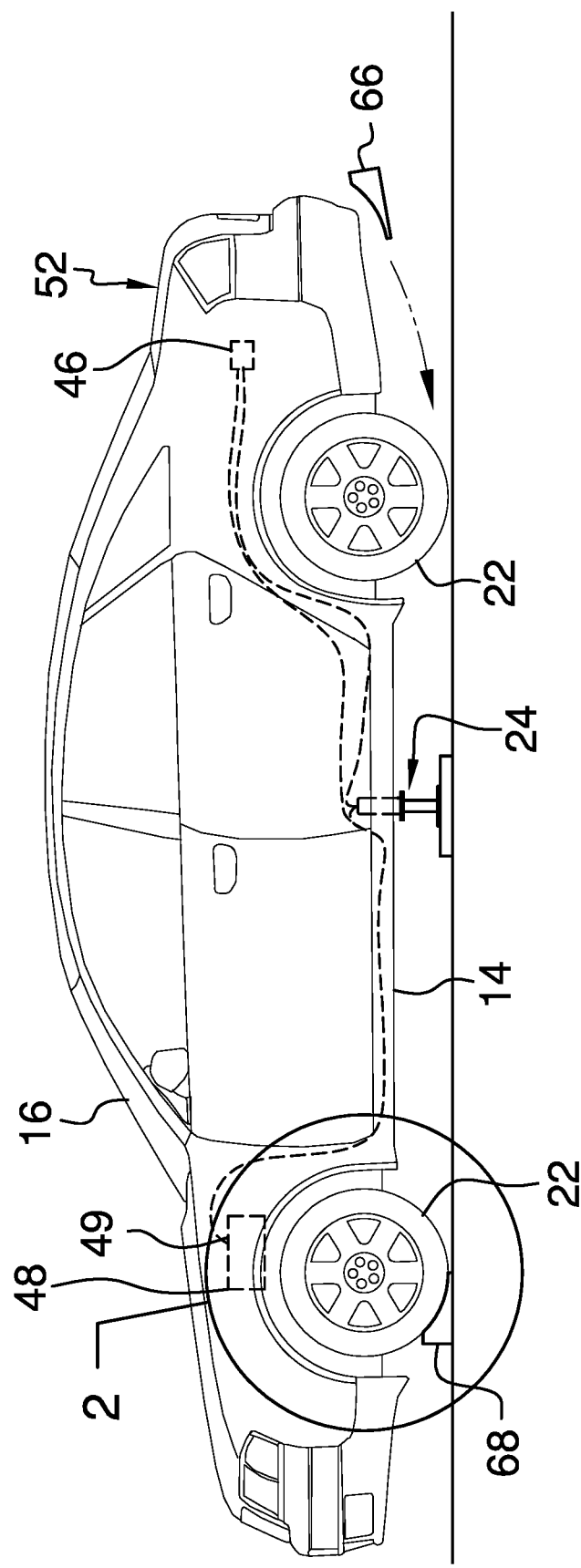
FIG. 2 is a perspective phantom view of an embodiment of the disclosure.
Figure 3:
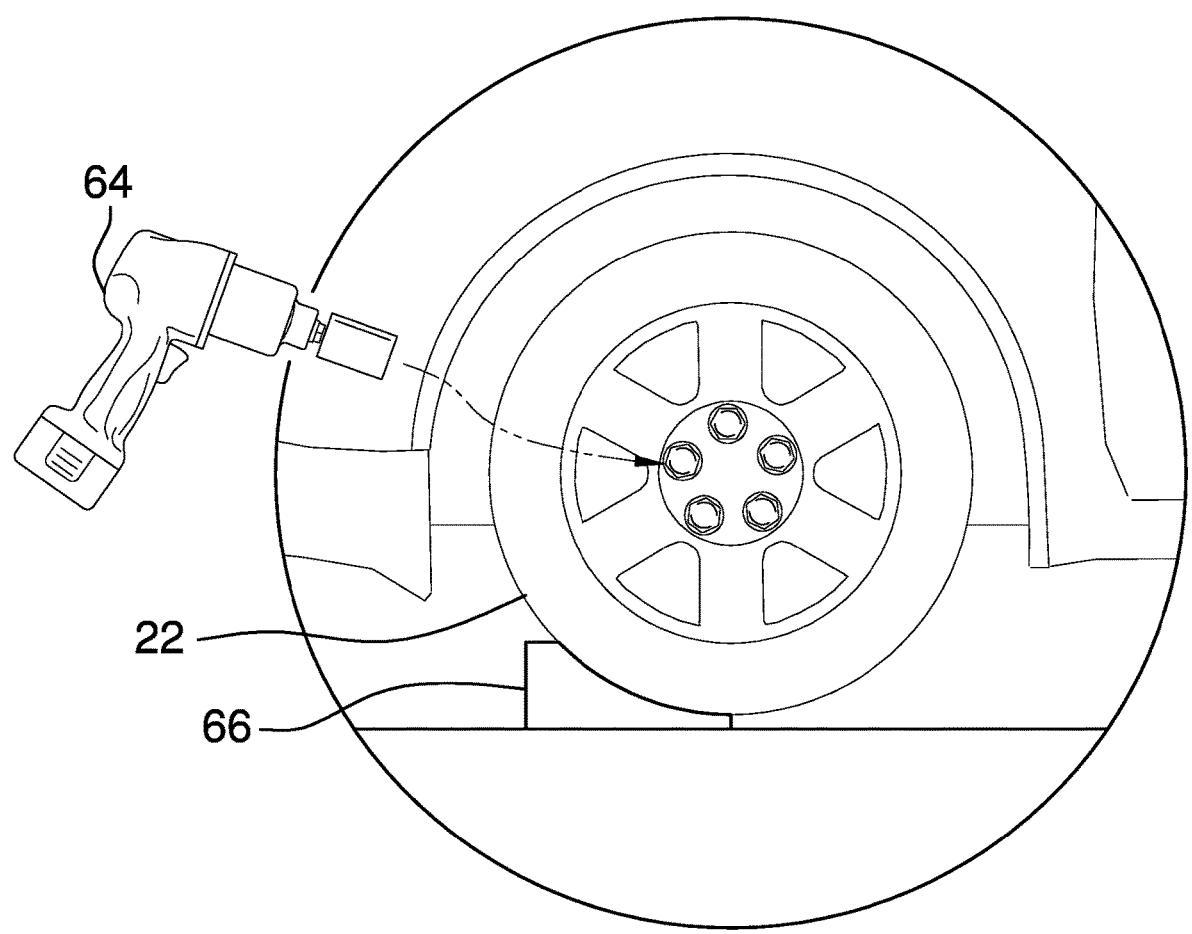
FIG. 3 is a detail view taken from circle 3 of FIG. 2 of an embodiment of the disclosure.
Figure 4:
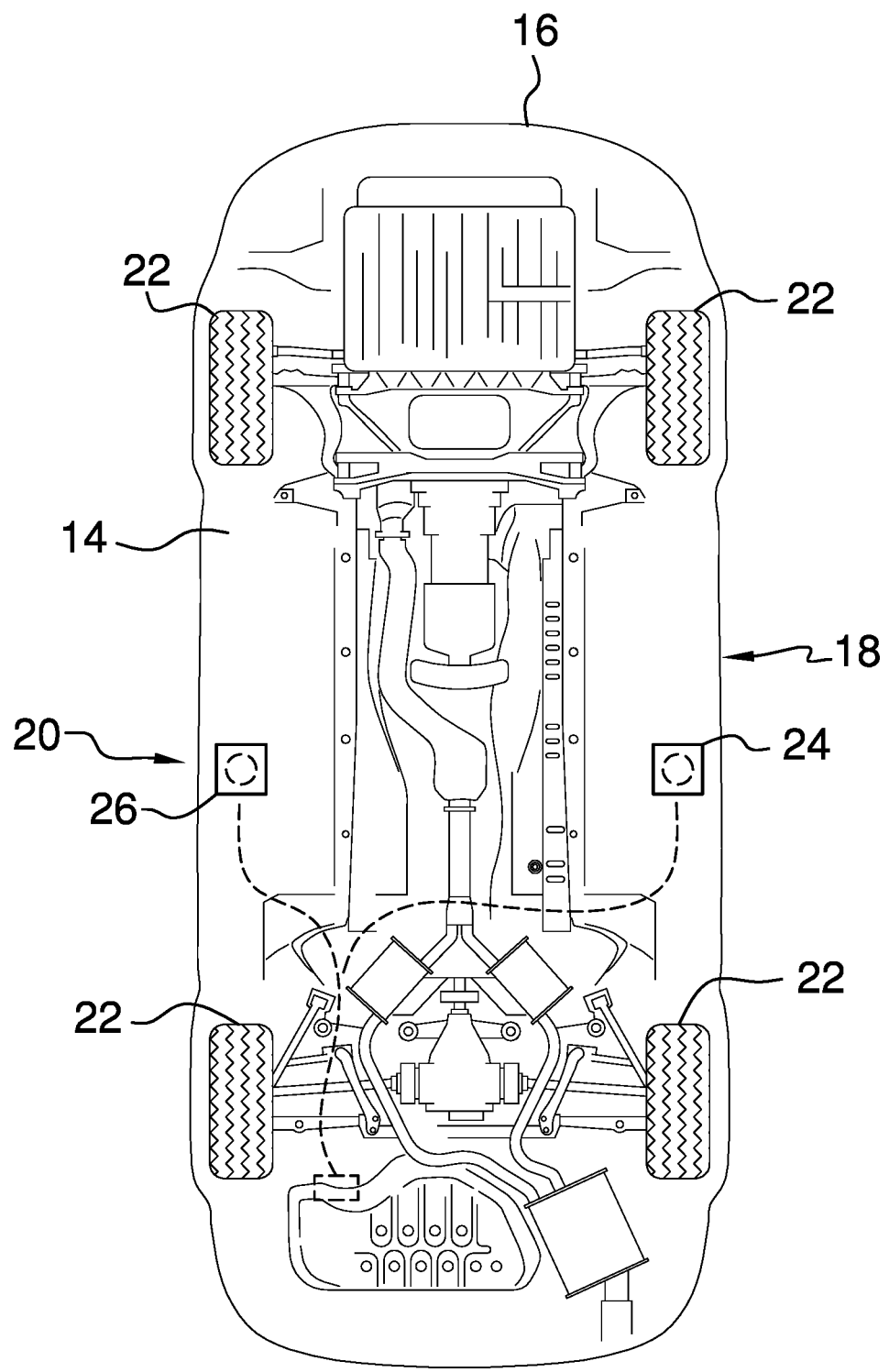
FIG. 4 is a bottom view of an embodiment of the disclosure.
Figure 5:
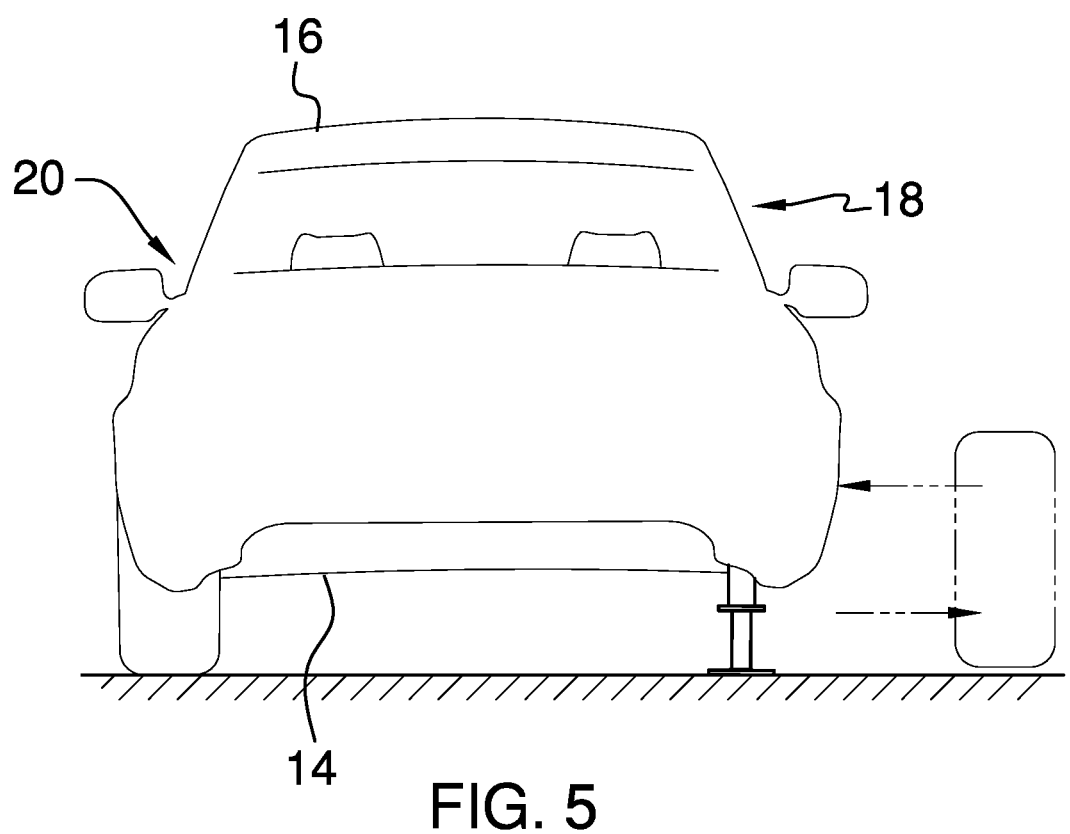
FIG. 5 is a perspective in-use view of an embodiment of the disclosure.
Figure 6:
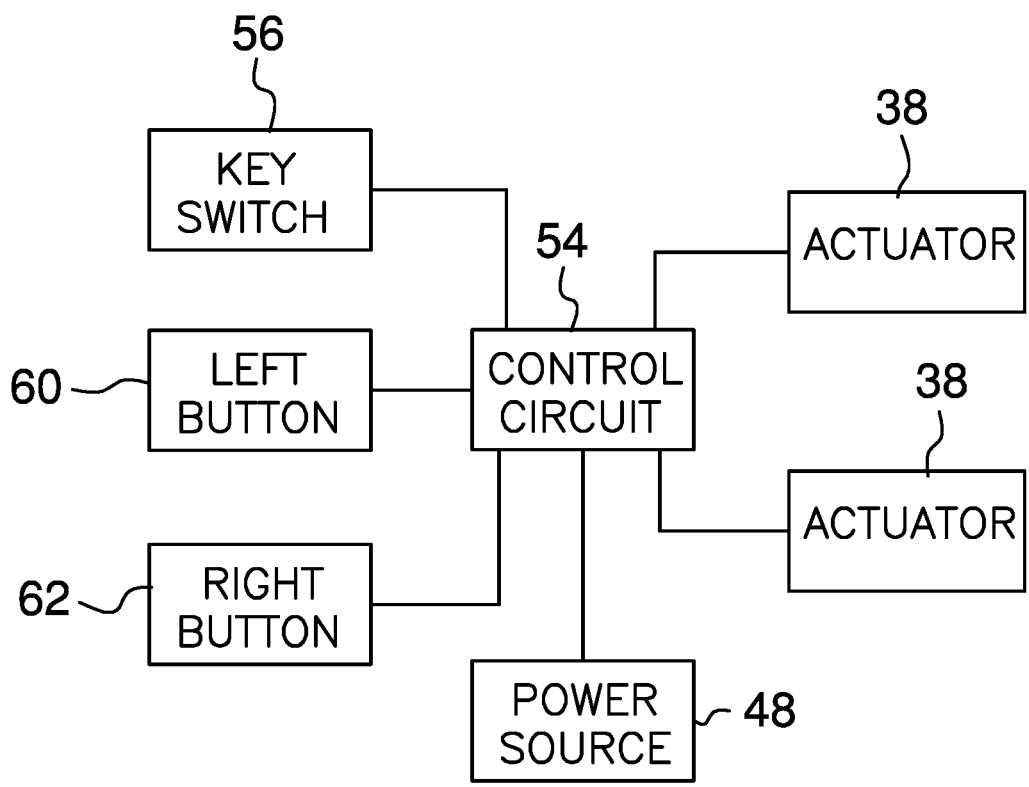
FIG. 6 is a schematic view of an embodiment of the disclosure.

With reference now to the drawings, and in particular to FIGS. 1 through 6 thereof, a new jacking device embodying the principles and concepts of an embodiment of the disclosure and generally designated by the reference numeral 10 will be described.

As best illustrated in FIGS. 1 through 6, the integrated vehicle jacking assembly 10 generally comprises a plurality of jacks 12 that are each coupled to a bottom side 14 of a vehicle 16. The vehicle 16 may be a motorized vehicle that is driven on public roadways, an off road vehicle or any other vehicle that has inflatable tires 22. Each of the jacks 12 is positioned on a respective driver's side 18 and passenger's side 20 of the vehicle 16. Each of the jacks 12 is actuatable into an extended position for lifting the respective driver's side 18 or passenger's side 20 of the vehicle 16 upwardly. In this way tires 22 on the respective driver's side 18 or passenger's side 20 of the vehicle 16 can be removed and replaced. Additionally, each of the jacks 12 is actuatable into a retracted position.

The pair of jacks 12 includes a left jack 24 and a right jack 26, and each of the left jack 24 and the right jack 26 comprises a cylinder 28 that has a top end 30 and a bottom end 32. The top end 30 is coupled to the bottom side 14 of the vehicle 16 and the bottom end 32 is open. Each of the left jack 24 and the right jack 26 includes a piston 34 that is slidably positioned in the cylinder 28 having the piston 34 extending downwardly from the bottom end 32. The piston 34 has a distal end 36 with respect to the bottom end 32 of the cylinder 28.

The piston 34 in each of the right jack 26 and the left jack 24 is positionable in a retracted position having the distal end 36 being positioned adjacent to the bottom end 32. Thus, the distal end 36 is spaced from the ground. The piston 34 in each of the right jack 26 and the left jack 24 is positionable in an extended position having the distal end 36 being spaced from the bottom end 32 of the cylinder 28. Thus, the distal end 36 engages the ground for lifting the vehicle 16.

Each of the right jack 26 and the left jack 24 includes an actuator 38 that is positioned in the cylinder 28. The actuator 38 engages the piston 34 and the actuator 38 urges the piston 34 between the extended position and the retracted position. The actuator 38 in each of the right jack 26 and the left jack 24 may comprise an electrical motor, an electrical linear actuator or any other type of electrical actuator that is capable of moving the piston 34 up and down. Each of the right jack 26 and the left jack 24 includes a plate 40 that has a top surface 42 and a bottom surface 44. The top surface 42 is coupled to the distal end 36 of the piston 34 and the bottom surface 44 abuts the ground when the piston 34 is positioned in the extended position.

A control unit 46 is positioned within the vehicle 16 such that the control unit 46 is accessible to a driver of the vehicle 16. The control unit 46 is operationally coupled to each of the jacks 12. Additionally, the control unit 46 actuates one or both of the jacks 12 between the extended position and the retracted position. The control unit 46 is electrically coupled to a power source 48 comprising an electrical system 49 of the vehicle 16.

The control unit 46 comprises a housing 50 that is positioned in a trunk 52 of the vehicle 16 and a control circuit 54 that is positioned in the housing 50. The control circuit 54 is electrically coupled to the electrical system 49 of the vehicle 16. The control circuit 54 receives an on input, an off input, a left raise input, a left lower input, a right raise input and a right lower input. The control circuit 54 has the actuator 38 in each of the jacks 12 being electrically coupled thereto.

The actuator 38 in the left jack 24 urges the piston 34 in the left jack 24 into the extended position when the control circuit 54 receives the on input and the left raise input. The actuator 38 in the left jack 24 urges the piston 34 in the left jack 24 into the retracted position when the control circuit 54 receives the on input and the left lower input. The actuator 38 in the right jack 26 urges the piston 34 in the right jack 26 into the extended position when the control circuit 54 receives the on input and the right raise input. The actuator 38 in the right jack 26 urges the piston 34 in the right jack 26 into the retracted position when the control circuit 54 receives the on input and the right lower input. The actuator 38 in each of the right jack 26 and the left jack 24 is turned off when the control circuit 54 receives the off input.

The control unit 46 includes a key switch 56 that is rotatably coupled to the housing 50. The key switch 56 is electrically coupled to the control circuit 54. The key switch 56 is positionable between an on position and an off position. Moreover, the control circuit 54 receives the on input when the key switch 56 is positioned on the on position. The control circuit 54 receives the off input when the key switch 56 is positioned in the off position. A key 58 is insertable into the key switch 56 for manipulating the key switch 56 between the on position and the off position.

The control unit 46 includes a left button 60 is movably coupled to the housing 50 and the left button 60 is electrically coupled to the control circuit 54. The left button 60 is positionable in a raise position or a lower position. The control circuit 54 receives the left raise input when the left button 60 is positioned in the raise position. Additionally, the control circuit 54 receives the left lower input when the left button 60 is positioned in the lower position.

The control unit 46 includes a right button 62 that is movably coupled to the housing 50 and the right button 62 is electrically coupled to the control circuit 54. The right button 62 is positionable in a raise position or a lower position. The control circuit 54 receives the right raise input when the right button 62 is positioned in the raise position. Additionally, the control circuit 54 receives the right lower input when the right button 62 is positioned in the lower position. As is most clearly shown in FIGS. 1 and 3, a power tool 64 may be included for removing and replacing the tires 22.

A plurality of wheel chocks 66 is provided and each of the wheel chocks 66 is positionable to engage tires 22 on the vehicle 16 that are not is raised when a respective one of the jacks 12 is actuated into the extended position. In this way the vehicle 16 is inhibited from rolling when the vehicle 16 is lifted. Each of the wheel chocks 66 has a top surface 68, a bottom surface 70, a front end 72 and a back end 74. The top surface 42 has a curved portion 76 that is concavely arcuate with respect to the bottom surface 70 of the wheel chocks 66. Moreover, the curved portion 76 on the top surface 42 of each of the wheel chocks 66 conforms to the curvature of tires 22 when the wheel chocks 66 are positioned against the tires 22.

In use, the key 58 is inserted into the key switch 56 and the key switch 56 is turned to the on position. Either the left button 60 or the right button 62 is depressed to actuate either the left jack 24 or the right jack 26 into the extended position thereby lifting tires 22 on either the passenger's side 20 of the vehicle 16 or the driver's side 18 of the vehicle 16 up from the ground. In this way the tires 22 that are lifted can be removed and replaced in the event of a tire blowout. Additionally, the wheel chocks 66 are positioned against the tires 22 that are not lifted from the ground. In this way the vehicle 16 is inhibited from rolling when the vehicle 16 is lifted. Either the left button 60 or the right button 62 is depressed to actuate either the left jack 24 or the right jack 26 into the retracted position and the wheel chocks 66 are removed from the tires 22 thereby facilitating the vehicle 16 to be driven.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An integrated vehicle jacking assembly being configured to lift one or more tires of a vehicle upwardly for removing and replacing the one or more tires, said assembly comprising:
    a plurality of jacks consisting of exactly two jacks, each of said jacks being coupled to a bottom side of a vehicle, each of said jacks being positioned on a respective driver's side and passenger's side of the vehicle, each of said jacks being actuatable into an extended position for lifting the respective driver's side or passenger's side of the vehicle upwardly thereby facilitating tires on the respective driver's side or passenger's side of the vehicle to be removed and replaced, each of said jacks being actuatable into a retracted position, each of said jacks being centrally positioned between a front and a rear of the vehicle;

a control unit being positioned within the vehicle wherein said control unit is configured to be accessible to a driver of the vehicle, said control unit being operationally coupled to each of said jacks, said control unit actuating one or both of said jacks between said extended position and said retracted position, said control unit being electrically coupled to a power source comprising an electrical system of the vehicle;

a plurality of wheel chocks, each of said wheel chocks being positionable to engage tires on the vehicle that are not being raised when a respective one of said jacks is actuated into said extended position thereby inhibiting the vehicle from rolling when the vehicle is lifted;

wherein said plurality of jacks being a left jack and a right jack, each of said left jack and said right jack including a cylinder having a top end and a bottom end, said top end being coupled to the bottom side of the vehicle, said bottom end being open;

wherein each of said left jack and said right jack includes a piston being slidably positioned in said cylinder having said piston extending downwardly from said bottom end, said piston having a distal end with respect to said bottom end of said cylinder, said piston being positionable in a retracted position having said distal end being positioned adjacent to said bottom end wherein said distal end is configured to be spaced from the ground, said piston being positionable in an extended position having said distal end being spaced from said bottom end of said cylinder wherein said distal end is configured to engage the ground for lifting the vehicle;

wherein each of said left jack and said right jack includes an actuator being positioned in said cylinder, said actuator engaging said piston, said actuator urging said piston between said extended position and said retracted position; and wherein said control unit comprises
a housing being positioned in a trunk of the vehicle, and
a control circuit being positioned in said housing, said control circuit being electrically coupled to the electrical system of the vehicle, said control circuit being configured to receive an on input, an off input, a left raise input, a left lower input, a right raise input and a right lower input, said control circuit having said actuator in each of said jacks being electrically coupled thereto.

2. The assembly according to claim 1, wherein each of said left jack and said right jack includes a plate having a top surface and a bottom surface, said top surface being coupled to said distal end of said piston, said bottom surface abutting the ground when said piston is positioned in said extended position.

3. The assembly according to claim 1, wherein said actuator in said left jack urges said piston in said left jack into said extended position when said control circuit receives said on input and said left raise input, said actuator in said left jack urging said piston in said left jack into said retracted position when said control circuit receives said on input and said left lower input.

4. The assembly according to claim 3, wherein said actuator in said right jack urges said piston in said right jack into said extended position when said control circuit receives said on input and said right raise input, said actuator in said right jack urging said piston in said right jack into said retracted position when said control circuit receives said on input and said right lower input.

5. The assembly according to claim 4, wherein said actuator in each of said right jack and said left jack is turned off when said control circuit receives said off input.

6. The assembly according to claim 5, wherein said control unit includes a key switch being rotatably coupled to said housing, said key switch being electrically coupled to said control circuit, said key switch being positionable between an on position and an off position, said control circuit receiving said on input when said key switch is positioned on said on position, said control circuit receiving said off input when said key switch is positioned in said off position.

7. The assembly according to claim 6, wherein said control unit includes a key being insertable into said key switch for manipulating said key switch between said on position and said off position.

8. The assembly according to claim 7, wherein said control unit includes a left button being movably coupled to said housing, said left button being electrically coupled to said control circuit, said left button being positionable in a raise position and a lower position, said control circuit receiving said left raise input when said left button is positioned in said raise position, said control circuit receiving said left lower input when said left button is positioned in said lower position.

9. The assembly according to claim 8, wherein said control unit includes a right button being movably coupled to said housing, said right button being electrically coupled to said control circuit, said right button being positionable in a raise position and a lower position, said control circuit receiving said right raise input when said right button is positioned in said raise position, said control circuit receiving said right lower input when said right button is positioned in said lower position.

10. The assembly according to claim 1, wherein each of said wheel chocks has a top surface, a bottom surface, a front end and a back end, said top surface having a curved portion being concavely arcuate with respect to said bottom surface, said curved portion on said top surface of each of said wheel chocks conforming to the curvature of tires when said wheel chocks are positioned against the tires.

11. An integrated vehicle jacking assembly being configured to lift one or more tires of a vehicle upwardly for removing and replacing the one or more tires, said assembly comprising:

a plurality of jacks consisting of exactly two jacks, each of said jacks being coupled to a bottom side of a vehicle, each of said jacks being positioned on a respective driver's side and passenger's side of the vehicle, each of said jacks being actuatable into an extended position for lifting the respective driver's side or passenger's side of the vehicle upwardly thereby facilitating tires on the respective driver's side or passenger's side of the vehicle to be removed and replaced, each of said jacks being actuatable into a retracted position, each of said jacks being centrally positioned between a front and a rear of the vehicle, said plurality of jacks being a left jack and a right jack, each of said left jack and said right jack including:

a cylinder having a top end and a bottom end, said top end being coupled to the bottom side of the vehicle, said bottom end being open;

a piston being slidably positioned in said cylinder having said piston extending downwardly from said bottom end, said piston having a distal end with respect to said bottom end of said cylinder, said piston being positionable in a retracted position having said distal end being positioned adjacent to said bottom end wherein said distal end is configured to be spaced from the ground, said piston being positionable in an extended position having said distal end being spaced from said bottom end of said cylinder wherein said distal end is configured to engage the ground for lifting the vehicle;

an actuator being positioned in said cylinder, said actuator engaging said piston, said actuator urging said piston between said extended position and said retracted position; and a plate having a top surface and a bottom surface, said top surface being coupled to said distal end of said piston, said bottom surface abutting the ground when said piston is positioned in said extended position;

a control unit being positioned within the vehicle wherein said control unit is configured to be accessible to a driver of the vehicle, said control unit being operationally coupled to each of said jacks, said control unit actuating one or both of said jacks between said extended position and said retracted position, said control unit being electrically coupled to a power source comprising an electrical system of the vehicle, said control unit comprising:

a housing being positioned in a trunk of the vehicle;

a control circuit being positioned in said housing, said control circuit being electrically coupled to the electrical system of the vehicle, said control circuit being configured to receive an on input, an off input, a left raise input, a left lower input, a right raise input and a right lower input, said control circuit having said actuator in each of said jacks being electrically coupled thereto, said actuator in said left jack urging said piston in said left jack into said extended position when said control circuit receives said on input and said left raise input, said actuator in said left jack urging said piston in said left jack into said retracted position when said control circuit receives said on input and said left lower input, said actuator in said right jack urging said piston in said right jack into said extended position when said control circuit receives said on input and said right raise input, said actuator in said right jack urging said piston in said right jack into said retracted position when said control circuit receives said on input and said right lower input, said actuator in each of said right jack and said left jack being turned off when said control circuit receives said off input;

a key switch being rotatably coupled to said housing, said key switch being electrically coupled to said control circuit, said key switch being positionable between an on position and an off position, said control circuit receiving said on input when said key switch is positioned on said on position, said control circuit receiving said off input when said key switch is positioned in said off position;

a key being insertable into said key switch for manipulating said key switch between said on position and said off position;

a left button being movably coupled to said housing, said left button being electrically coupled to said control circuit, said left button being positionable in a raise position and a lower position, said control circuit receiving said left raise input when said left button is positioned in said raise position, said control circuit receiving said left lower input when said left button is positioned in said lower position;

a right button being movably coupled to said housing, said right button being electrically coupled to said control circuit, said right button being positionable in a raise position and a lower position, said control circuit receiving said right raise input when said right button is positioned in said raise position, said control circuit receiving said right lower input when said right button is positioned in said lower position; and a plurality of wheel chocks, each of said wheel chocks being positionable to engage tires on the vehicle that are not being raised when a respective one of said jacks is actuated into said extended position thereby inhibiting the vehicle from rolling when the vehicle is lifted, each of said wheel chocks having a top surface, a bottom surface, a front end and a back end, said top surface having a curved portion being concavely arcuate with respect to said bottom surface, said curved portion on said top surface of each of said wheel chocks conforming to the curvature of tires when said wheel chocks are positioned against the tires.

\* \* \* \* \*